United States Patent [19]

Sheldon

[11] Patent Number: 4,529,635
[45] Date of Patent: Jul. 16, 1985

[54] RADIOGRAPH IDENTIFYING MEANS

[76] Inventor: Andrew D. Sheldon, 36 Whinchat Way, Bradwell, Great Yarmouth, Norfolk, England

[21] Appl. No.: 464,675

[22] Filed: Feb. 7, 1983

[30] Foreign Application Priority Data

Feb. 17, 1982 [GB] United Kingdom ............... 8204594
Oct. 6, 1982 [GB] United Kingdom ............... 8228499

[51] Int. Cl.³ ........................... B32B 3/00; B32B 5/16
[52] U.S. Cl. ........................................ 428/40; 428/156;
428/164; 428/461; 428/913; 428/906; 428/344;
428/172
[58] Field of Search ............... 428/913, 40, 252, 461,
428/285, 344, 156, 161, 164, 172, 906, 913.3

[56] References Cited

U.S. PATENT DOCUMENTS

| | | | |
|---|---|---|---|
| 2,654,684 | 10/1953 | Heikin | 428/344 X |
| 2,808,352 | 10/1957 | Coleman et al. | 428/344 X |
| 3,475,213 | 10/1969 | Stow | 428/344 X |
| 3,582,452 | 6/1971 | Britton | 428/461 X |
| 3,908,065 | 9/1975 | Stigen | 428/164 X |
| 4,071,391 | 1/1978 | Haberstroh et al. | 428/461 X |
| 4,266,009 | 5/1981 | Veda et al. | 428/913 X |
| 4,312,688 | 1/1982 | Brodis et al. | 428/344 X |

FOREIGN PATENT DOCUMENTS

| | | | |
|---|---|---|---|
| 52-2074 | 3/1977 | Japan | 428/172 |
| 53-6017 | 3/1978 | Japan | 428/172 |
| 54-8786 | 5/1979 | Japan | 428/172 |

Primary Examiner—George F. Lesmes
Assistant Examiner—Nancy A. B. Swisher
Attorney, Agent, or Firm—Neal J. Mosely

[57] ABSTRACT

A flexible character-indentable plastics embossing tape (11) is backed by and bonded to a lead strip not more than 0.025 inches (i.e. approximately 0.65 millimeters) thick, to form a tape suitable for identifying radiographs. The lead strip (13) is itself backed by a relatively thin and flimsy plastics or fabric strip (15) which, when removed, allows the lead (and hence the lead-plastic tape as a whole) to be pressure-bonded to the surface to be radiographed.

A conventional tape-embossing gun is used to indent the desired characters in succession, and in order, into the lead-backed tape, without necessarily severing the lead; and then the backing strip (15) is peeled away to expose the layer (14) of adhesive which pressure-bonds the indented tape to the object to be radiographed.

X-rays incident on the embossed tape will cause the raised characters (a) to show up dark on the subsequently-developed film, while the raised side areas (b) will show up white. Each character will thus stand out on the developed film.

14 Claims, 2 Drawing Figures

RADIOGRAPH IDENTIFYING MEANS

FIELD OF THE INVENTION

The invention relates to radiograph identifying means and is particularly applicable to industrial radiography.

Industrial radiography is widely used as a method of non-destructive testing of cast or fabricated components. For example a weld is often radiographed in an attempt to detect flaws before the welded structure is put into service, or after the welded structure has sustained impact. High-technology industries working to close margins of safety make extensive use of X-ray and Gamma-ray radiography to check the components they produce.

REVIEW OF THE KNOWN ART

The conventional method of identifying individual radiographs or individual series of radiographs involves the use of a stock of lead letters and numbers. Typically these letters and numbers will be relatively small and will each be individualy cast as a lead character of the order of ⅛th of an inch (say 3–5 mm) thick.

The radiographic technician selects from a box of such characters the combination of letters and numbers with which he desires to identify a particular radiograph or series of radiographs which he is about to take. He lays them out in-line on a suitably flat surface and places masking tape over the top of the line of characters to hold them temporarily in place relative to one another. He then lifts the tape-held identification set of characters off the flat surface on which he assembled them initially, places the set very carefully on the surface of the object he intends to radiograph, and applies more masking tape to hold the taped set on the object in a position in which it will then be included within the area of the radiograph he then takes.

When he has radiographed the object, and the identification set, the technician has to untape the set from the object and has to salvage and return to the box each character in the set.

The conventional method just outlined has been used for many years and has a number of drawbacks.

To begin with, the miniature individual lead characters are extremely difficult to handle and are easily lost in transit from the box to the object and, hopefully but not always, back again. They are equally easily damaged in handling, and they do not resist repeated use at all well.

In addition, the production of a professionally acceptable neat identification set depends entirely on the manual dexterity of the technician in arranging the characters in a straight line with individual characters equally spaced from one another. Even if he manages this successfully, the subsequent application of masking tape to hold the set of characters for transfer to the object will invariably displace the characters.

In conditions of high humidity, the masking tapes lose their ability to hold the metal characters in place. Vital numbers and letters can easily be lost from this cause. Even if they are successfully positioned adjacent the area to be radiographed, individual numbers and letters can slide out of place and will then obscure unintentionally a part of the area shown on the developd radiographic film.

Under wet or windy conditions these conventional radiograph-identifying sets are almost impossible to set up in a professionally acceptable neat manner.

When a new set of conventional characters is first brought into use, the individual characters and numbers will usually be partitioned-off in their carrying box. Inevitably, however, the letters and numbers become mixed in the box and selection becomes time-consuming and frustrating.

Given the high rate of loss of individual characters and the cost of manufacturing them, the conventional method is extremely expensive as well as being unsatisfactory to operate.

SUMMARY OF THE INVENTION

The invention is based on the concept of indenting the desired identifying characters into a lead-backed plastics embossing tape which can then be stuck on to the object to be radiographed.

If the thickness of the lead backing strip of such a tape is suitably chosen, the tape can be produced on a tape-embossing gun of the kind which is already familiar for use with plastic embossing labelling tape. Such a gun may be modified to handle the lead-backed tape with which the invention is concerned, but it is entirely possible to use some guns without modification and still produce wholly satisfactory radiograph identification sets of characters on the tape.

By indenting the lead-backed tape, and pushing each individual character up out of the plane of the lead strip and into the thus embossed plastic strip above it (without necessarily severing the lead character completely from its surrounding lead strip) the individual characters will stand out on the radiograph when the radiographic film is developed.

The use of a lead-backed tape to produce a radiograph identifying set has many advantages over the conventional method method previously outlined.

The method is clearly far quicker and neater than the previous individual-character-and-adhesive-tape method. It is also far cheaper: not only can the expensive individual lead characters be dispensed with, but the lead-backed tape now proposed can be made sufficiently cheaply for each tape produced to be discarded after having been used once. Every new identifying set can be individually produced and the previous problems are eliminated.

Plastic embossing tape currently available is self-adhesive once its plastic backing strip is removed. Lead-backed tape embodying the invention can similarly be made self-adhesive and can be supplied with an easily-removed backing strip of plastics or other suitable material. The ease of application of such self-adhesive strip when compared with the previous conventional method is obvious and needs no further elaboration.

Plastic embossing tape currently available is flexible enough to be sold in reels, whilst being tough enough to be embossed without fracturing, and any lead-backed plastic embossing tape used in the present invention will preferably also be sufficiently flexible to be sold in reels and to conform readily to anything other than an unduly sharp curvature when the embossed tape is subsequently pressed into place on the object to be radiographed.

To achieve these objectives there must clearly be a limit to the thickness of lead strip used to back the plastic tape. Tape of not more than about 0.015 inches (approximately 0.3 millimeters) thick, and preferably of the order of 0.007 inches to 0.010 inches (ie. approximately 0.15 millimeters to 0.25 millimeters) thick, has been found to give satisfactory results when combined with a typical currently-available plastic embossing tape which is also of the order of 0.007 inches to 0.010 inches (ie. 0.15 millimeters to 0.25 millimeters) in thickness.

It is however conceivable and is entirely within the scope of the present invention that lead strip up to perhaps 0.025 inches (ie. approximately 0.65 millimeters) in thickness would give acceptable results.

Specifically in accordance with the invention, a flexible character-indentable tape suitable for use as a radiograph-identifying means comprises a layer of plastics embossing strip backed by and bonded to a layer of lead strip with the lead strip not more than 0.025 inches (ie. approximately 0.65 millimeters) thick.

In practical embodiments, the plastics strip may be bonded to the lead strip by a pressure-sensitive adhesive. The coating weight per unit area of tape of the adhesive then becomes important. The bond must hold under normally-intended flexing of the tape, but if it is over-strong it could affect the flexing qualities adversely as well as being unnecessarily expensive. Preferably therefore the coating weight is within the range 35 to 55 grams per square meter, and it has been found especially advantageous to keep it within the range 40 to 50 grams per square meter.

Where the lead strip is itself backed by and temporarily bonded to a removable and relatively thin backing strip of plastics or other suitable material, for example fabric, the backing strip when removed will enable the lead strip (and hence the lead-plastics tape as a whole) to adhere to a surface to be identified by the character-indented tape. A pressure-sensitive adhesive can again be used to bond the backing strip removably to lead strip, and again the coating weight of the adhesive should be carefully chosen. Preferably it is within the range 50 to 80 grams per square meter, and it has been found especially advantageous if the coating weight of this adhesive is approximately 60 grams per square meter.

The outer surface of the plastics strip (ie. that surface not bonded to the lead strip) may be coloured with a suitable solvent-dilutable pigmented ink. Conventional plastics embossing tape is already so coated.

It has been found that satisfactory tapes embodying the invention can be made by pressure-laminating the lead strip to the plastics embossing strip using a laminating pressure of the order of 60 pounds per square inch. (ie. approximately $4.6 \times 10^4$ kg/m$^2$). This gives a good enough bond to hold under most normally-intended flexing of the tape.

The concept of producing a radiograph-identifying line of characters by indenting the characters, in succession and in order, into a tape whose features are in accordance with the invention, is both novel and non-obvious when compared with the prior methods reviewed above.

DESCRIPTION OF THE PREFERRED MEANS

Figure 1:
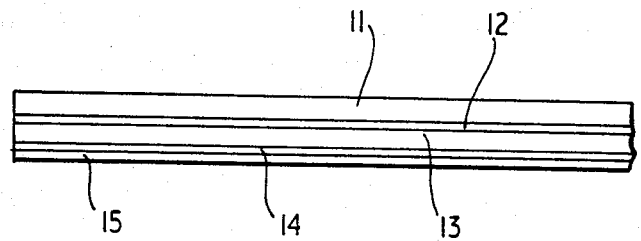
FIG. 1 shows diagrammatically and in cross-section a lead-backed plastics embossing tape embodying one aspect of the present invention.

The tape illustrated is maufactured in a continuous length and is intended for use with a tape-embossing gun. One gun currently available for use with conventional plastic embossing tape is made by the 3M Company and is sold in the United Kingdom under the trade mark and model designation "Scotch Labeler EJ.3".

Plastics tape for use with such a gun will typically be 9 mm (just over ⅓ of an inch) or 12 mm (just under ½ an inch) in width and will be of constant thickness approximately 0.008 inches (ie. approximately 0.2 millimeters) throughout its length. The plastics tape is referenced 11 in the drawings.

The much thinner and relatively flimsy white backing strip, not shown, with which such tape is conventionally supplied is removed to expose the layer 12 of adhesive on one face of the strip. To this layer 12 is pressure-laminated a continuous strip 13 of lead foil which is the same width as the plastic strip 11 and which is also, in this particular case, approximately the same thickness as the plastics strip.

The face of the lead foil 13 opposite that which pressure-bonds to the adhesive 12 has its own layer 14 of adhesive; and this adhesive layer 14 carries a backing strip 15 very similar to that used on conventional plastics embossing tape.

The backing strip 15 can easily be removed from the adhesive layer 14, and discarded, without destroying the integrity of the adhesive layer 14 whose purpose is to pressure-bond the composite laminated lead-plastics tape 11, 12, 13 to an object to be radiographed.

The tape illustrated is fed through the embossing wheel of the Scotch EJ.3 gun referred to above. The gun is operated to indent desired characters into the tape one after another until the predetermined identifying set of characters has been produced on the tape. In familiar manner, the coloured plastic tape 11 will show white in the raised areas where the character is embossed into it and the plastics stretches and thins.

As FIG. 1 illustrates, the indenting or embossing action of the gun also stretches and thins the lead along the sides 12a of each character. The top region 13b of the character, formed by an area of lead which has been displaced entirely out of the plane of the rest of the lead strip without having been completely severed from that strip, is not appreciably altered in thickness.

X-rays incident on the embossed tape in the direction of the arrow in FIG. 2 will cause the area of character "a" to show up dark on the subsequently-developed film, whilst the "side" areas "b" will show up white.

Each character will thus stand out on the developed film, and the complete set of characters will identify the individual radiograph or an individual set of radiographs in the manner desired by the radiographic technician who originally produced the identifying tape.

If the embossed lead-backed tape is produced on an unmodified already-available gun, as just specifically described and illustrated, the depth of the indentation in the tape will of course be somewhat less than that which would be produced using a conventional plastics embossing tape without the lead backing. By way of indication the depth of indentation might be say 0.020 inches to 0.025 inches (approximately 0.5 millimeters to 0.65 millimeters), ie. each character will be raised out of the surface of the plastics tape by approximately that amount.

Figure 2:
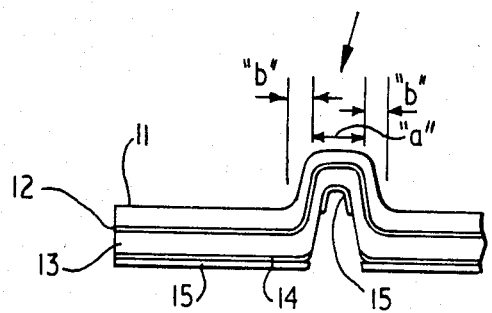
FIG. 2 shows the same tape into which a character has been indented by a tape-embossing gun.

The embossing angle, ie. the total angle defined between the facing sloping sides of the indentation illustrated in FIG. 2, will most probably lie between 30° and 90° in practical embodiments. Using an unmodified gun, as indicated above, the angle would probably be about 50°.

The tape illustrated is an unplasticised rigid PVC tape of the kind used in conventional plastics labelling embossers. The cohesion factor of the adhesive bonding the plastics strip to the lead strip is of the order of 2000 grams. This adhesive also passes a shear test in which the adhesive, coated within the weight per unit area ranges indicated above, holds a 12 millimeter by 25 millimeter patch of tape for at least 50 hours under one kilogramme load when the backing strip has been removed from the adhesive and the patch pressed against a bar of suitable material.

The relatively flimsy white backing strip referenced 15 in the drawings can be of plastics material, and of thickness, similar to that used on conventional plastics embossing tape.

The plastics strip and lead strip, and any backing tape will of course be nominally constant thickness throughout their width and length. Specific adhesives can be chosen by the skilled reader.

I claim:

1. A radiograph-identifying tape means, said means comprising
   a narrow, elongated strip of lead of a thickness sufficient to accept and retain a configuration produced by embossing,
   a layer of pressure sensitive adhesive along one surface of said lead strip for adhering the same to a surface,
   a layer of plastics strip, of a toughness and thickness sufficient to be embossed, backed by and bonded by a pressure-sensitive adhesive applied to the side opposite said first named adhesive layer to said embossable lead strip, and
   said bonded lead-plastics-adhesive tape being inherently flexible and embossable as a unitary structure.
2. A tape according to claim 1 in which
   said lead strip has a relatively thin strip of material temporarily and removably secured thereon which, when removed, enables said lead strip, and hence the lead-plastics-adhesive tape as a whole, to adhere to a surface to be identified by the character-indented tape.
3. A tape according to claim 1 in which
   the thickness of said lead strip being about 0.007 inches, i.e., about 0.15 millimeters, to about 0.025 inches, i.e., about 0.65 millimeters.
4. A tape according to claim 3 in which
   the plastics strip is bonded to the lead strip by a pressure-sensitive adhesive whose coating weight per unit area of tape is from about 35 grams per square meter to about 55 grams per square meter.
5. A tape according to claim 4 in which
   the coating weight is from about 40 grams per square meter to about 50 grams per square meter.
6. A tape according to claim 4 in which
   said plastics strip is of substantially the same thickness as said lead strip.
7. A tape according to claim 3 in which
   the strip of lead is further backed by and temporarily bonded to a removable and relatively thin strip which, when removed, enables said lead strip, and hence the lead-plastics tape as a whole, to adhere to a surface to be identified by the character-indented tape.
8. A tape according to claim 7 in which
   the plastics backing strip is bonded to the lead strip by a pressure-sensitive adhesive whose coating weight per unit area of tape is within the range of from about 50 grams per square meter to about 80 grams per square meter.
9. A tape according to claim 8 in which
   the said coating weight is about 60 grams per square meter.
10. A tape according to claim 3 in which
    said plastics strip is of substantially the same thickness as said lead strip.
11. A tape according to claim 1 in which
    the thickness of the lead backing strip is 0.007 inches to 0.010 inches, i.e., about 0.15 millimeters to 0.25 millimeters.
12. A tape according to claim 11 in which
    said plastics strip is of substantially the same thickness as said lead strip.
13. A tape according to claim 1 in which
    said lead backing strip is about 0.008 inches, i.e., about 0.2 millimeters thick.
14. A tape according to claim 13 in which
    said plastics strip is of substantially the same thickness as said lead strip.

* * * * *